S. STERN.
TIRE PROTECTOR.
APPLICATION FILED DEC. 16, 1910.
1,044,703.
Patented Nov. 19, 1912.
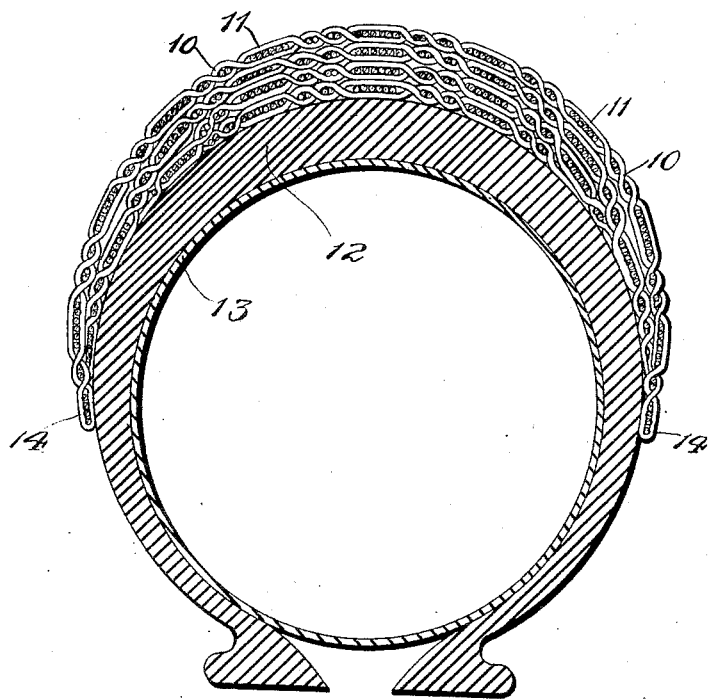
Witnesses
Inventor
S. Stern
By
Attorneys.

UNITED STATES PATENT OFFICE.

SIMON STERN, OF ALBUQUERQUE, NEW MEXICO.

TIRE-PROTECTOR.

1,044,703. Specification of Letters Patent. Patented Nov. 19, 1912.

Application filed December 16, 1910. Serial No. 597,710.

*To all whom it may concern:*

Be it known that I, SIMON STERN, a citizen of the United States, residing at Albuquerque, in the county of Bernalillo and State of New Mexico, have invented certain new and useful Improvements in Tire-Protectors, of which the following is a specification.

This invention relates to protectors for pneumatic tires and has for its object to provide a device which may be readily applied to the tire without changing or altering the structure thereof.

Another object of the invention is to provide a device of this character which does not interfere with the resiliency of the tire but which conforms to all of the movements of the latter when in use.

For a full understanding of the invention, reference is to be had to the following description and accompanying drawing in which the figure is a transverse section of a tire with the improved protector applied and in section.

Corresponding and like parts are referred to in the following description and indicated on the accompanying drawing by the same reference characters.

As indicated in the drawing the outer tube of the tire is designated 12 while the inner tube is designated 13.

The tire protector consists of a series of superposed layers of wire fabric indicated at 10. The strands of this fabric are indicated at 11. The outermost layer of the fabric is of the greatest transverse breadth and the inner layers gradually decrease in transverse breadth, and each narrower layer is joined at its edges only with the next adjacent broader layer. The edges of the outer-most layer, indicated at 14, are adapted to bear against the opposite sides of the outer tube 12 of the tire when the protector is in position upon the same, and the narrower layers are interposed between intermediate portion of the outer-most layer and that part of the outer tube 12 which usually travels upon the ground. When the inner tube 13 is inflated, the outer tube 12 is expanded, and by reason of the fact that the edges 14 of the outer-most layer or fabric bear against the opposite sides of the outer tube 12, the expansion of the said tube will hold the protector in position upon the tire. In as much as the narrower layers are connected with the broader layers at the edges only of the narrower layers, the intermediate portions of the layers are free to move with relation to each other; and notwithstanding the fact that the layers are made up of metallic strands, the presence of the protector does not deprive the tire of that resiliency that it should have.

Having described the invention, what I claim is.

A tire protector comprising superposed layers of wire fabric the outer-most layer being of greatest transverse breadth and the inner layers gradually decreasing in transverse breadth, each narrower layer being joined at its edges only with next adjacent broader layer.

In testimony whereof, I affix my signature in presence of two witneses.

SIMON STERN. [L. S.]

Witnesses:
ALBERT FABER,
OTTO H. THORMAN.

---

Copies of this patent may be obtained for five cents each, by addressing the "Commissioner of Patents, Washington, D. C."